May 24, 1949. K. C. D. HICKMAN 2,471,325
VACUUM DEHYDRATION
Original Filed Oct. 18, 1944
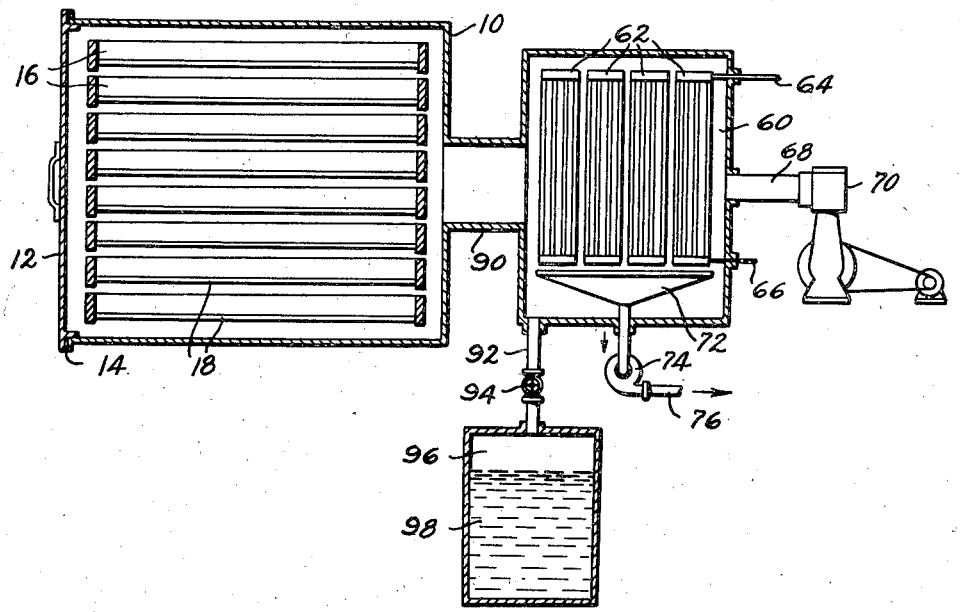
KENNETH C.D. HICKMAN
INVENTOR.
BY
ATTORNEYS Patented May 24, 1949

2,471,325

UNITED STATES PATENT OFFICE 2,471,325

VACUUM DEHYDRATION

Kenneth C. D. Hickman, Rochester, N. Y., assignor to Distillation Products, Inc., Rochester, N. Y., a corporation of Delaware Original application October 18, 1944, Serial No. 559,190. Divided and this application October 17, 1947, Serial No. 780,570

2 Claims. (Cl. 34—5)

This invention relates to improved procedure for dehydration under vacuum and in particular to vacuum dehydration of substances while in the frozen state.

The dehydration of substances under vacuum and while in the frozen state is well known. This procedure requires the use of a vacuum amounting to less than 4.7 mm. since this is the vapor pressure of a mixture of water and ice. This, of course, means that the water vapors removed have an enormous volume. The removal of this large volume of water vapor at these low pressures has given considerable trouble. One of the most common methods of removing water vapor is to condense it in the form of ice on a highly cooled surface. This procedure is inefficient because the ice accumulates on the condensing surface and since ice is not a good transmitter of heat, the layer of ice becomes less efficient as it increases in thickness. Condensation of the water vapor, therefore, is less efficient toward the last part of the dehydration process when small volumes of water vapor are to be removed and when high efficiency is desired. Also, this prior art procedure required discontinuation of the dehydration operation in order to remove ice from the condenser.

My invention has for its object to avoid the above-mentioned difficulties in vacuum dehydration, particularly in the frozen state. Another object is to provide improved vacuum dehydration procedure. Still another object is to provide improved procedure for dehydrating in the frozen state whereby the water vapor is removed from the dehydration system in the form of liquid water. Another object is to provide economical procedure for dehydration in the frozen state. Another object is to improve the state of the art. Other objects will appear hereinafter.

These and other objects are accomplished by my invention which includes removing water vapor from the substance to be dehydrated by exposing it to a vacuum, condensing these water vapors with the vapors of a substance which lowers the freezing point of water and removing the condensed liquid mixture from the system.

In the following description I have set forth several of the preferred embodiments of my invention but it is to be understood that these are given by way of illustration, and not in limitation thereof.

The single figure of the accompanying drawings is a vertical section partly in elevation of apparatus suitable for carrying out dehydration procedure with freezing of the water vapor removed and removal of the water vapor by solvent action.

Referring to the figure, numeral 10 designates a gas-tight dehydration chamber provided with a removable door 12 making a gas-tight contact with casing 10 by means of gasket 14. Numeral 16 designates a plurality of trays heated by circulation of heating fluid through coil 18 integral with the base thereof.

Numeral 90 designates a wide-aperture conduit which directly connects dehydration chamber 10 with condensing chamber 60. Condensing chamber 60 is provided with another conduit 92 which connects through valve 94 to gas-tight container 96 which contains a liquid 98 which has the property of reducing the freezing point of water. Conduit 68 connects condensing chamber 60 with roughing pump 70. Inside condensing chamber 60 are a plurality of refrigerated coils 62 which are cooled by circulation of cold refrigerating fluid through conduits 64 and 66. Funnel 72 is positioned below cooling coils 62 and the conduit-like bottom portion of funnel 72 is connected to withdrawal pump 74 which is provided with a discharge conduit 76.

In operating the apparatus illustrated in the drawings, the material to be dehydrated is introduced into trays 16. This material may be frozen before introduction if dehydration in the frozen state is contemplated, or it may be frozen in the trays during operation by rapid removal of the water vapor. Plate 12 is then closed, and roughing pump 70 is put into operation. Cooling fluid is circulated through cooling coils 62.

The material to be dehydrated is introduced as previously described and condensing coils 62 and pump 70 are put into operation. Valve 94 is opened to permit sufficient vapor to enter to form a low melting eutectic mixture with the water vapors. These vapors pass upwardly through conduit 92 and come into contact with the coils 62 and are condensed thereon with the water vapors from chambers 10. They form a low melting point solution with the water condensate. This liquid solution drops into funnel 72 and is withdrawn from the system by pump 74. Solvent vapor is prevented from getting back into chamber 10 by the rush of water vapor emerging therefrom. Of course, the mixture of melted ice and solvent which is expelled from the system can be distilled and the solvent reused in the process. Suitable solvents are ethyl, methyl, and isopropyl alcohols and acetone. A calibrated orifice may be used in place of valve 94 to permit the proper amount of solvent vapors to flow into the system.

A natural compensation occurs with this system. Suppose that an eutectic mixture consists of one part of water and one part of solvent. Suppose, however, that a worthwhile lowering of freezing point occurs with a mixture of one part of solvent with ten parts of water. Suppose further that a small constant stream of solvent vapor is emitted, said stream remaining constant throughout the cycle of dehydration. At first much water will be given off from the relatively wet, warm charge and this will be condensed at a relatively high temperature with a small proportion of solvent under conditions evidently permissible at the start. As drying proceeds and the vapor pressure falls, the quantity of water vapor also falls, the melting point of the condensate falls; but the supply of power to the condensate coils being approximately constant, the temperature of refrigeration falls. Finally drying is accomplished under very high vacuum with a very low-temperature eutectic mixture dripping off the very cold coils.

The temperature of condenser 60 can be adjusted so that large amounts of solvent vapor are not required. Thus, if dehydration chamber 10 is at a pressure of 1 mm. corresponding with a temperature of $-8°$ C., the condensing coils 62 could be maintained at a temperature of $-12°$ C. The container 96 would be filled with isopropyl alcohol and upon opening valve 94 it would slowly be vaporized and would deposit on the condensing coils 62 to form a eutectic mixture of water and isopropyl alcohol which is liquid at $-12°$ C. and which can thus be withdrawn from the apparatus in liquid form. It is not necessary that pure solvent be used; for instance, the withdrawn mixture can be treated merely to enrich the solvent contained therein and the enriched mixture then reused.

This application is a division of my co-pending application Serial No. 559,190, filed October 18, 1944, which has matured into U. S. Patent No. 2,436,693, granted February 24, 1948.

What I claim is:

1. The dehydration process which comprises exposing water containing material in a frozen state to vacuum over a substantial time interval and under such controlled conditions as to remove therefrom progressively decreasing amounts of water in the form of water vapor, progressively admixing with said removed water vapors the vapors of a normally liquid substance having the property of lowering the freezing point of water, said vapors being admixed in such relative amounts as to provide progressively increasing proportions of said freezing point lowering vapors in the mixture, progressively condensing said admixed vapors to produce a liquid mixture of water and said substance and progressively removing said liquid mixture while in liquid form.

2. In the process of dehydrating water-containing material in the frozen state by evacuation effective to cause progressive evolution of water vapor therefrom in progressively decreasing volume until said material is substantially dehydrated and condensing said evolved water vapor while still at reduced pressure by contact with a surface cooled to a temperature effective to freeze water vapor coming in contact therewith, the steps which comprise progressively lowering the pressure at which said water vapor is evolved as the volume of evolved water vapor decreases, progressively lowering the temperature at which said evolved water vapor is condensed, and mixing with said evolved water vapor, before condensation, vapors of a normally liquid substance, having the property of lowering the freezing point of water, in progressively increasing amounts relative to the volume of said evolved water vapor and thereby forming progressively lower-melting mixtures thereof, progressively condensing said admixed vapors to produce a liquid mixture of water and said substance, and progressively removing said liquid mixture while in liquid form.

KENNETH C. D. HICKMAN.

REFERENCES CITED

The following references are of record in the file of this patent:

UNITED STATES PATENTS

| Number | Name | Date |
|---|---|---|
| 2,293,453 | Clark | Aug. 18, 1942 |
| 2,302,253 | Perchel et al. | Nov. 17, 1942 |
| 2,343,246 | Schechter et al. | Mar. 7, 1944 |
| 2,345,548 | Flosdorf et al. | Mar. 28, 1944 |
| 2,406,682 | Hayes et al. | Aug. 27, 1946 |

FOREIGN PATENTS

| Number | Country | Date |
|---|---|---|
| 18,698 | Great Britain | Nov. 10, 1910 |
| 591,095 | France | June 27, 1925 |
| 840,092 | France | Apr. 18, 1939 |